United States Patent [19]

Mouton

[11] Patent Number: 4,512,722

[45] Date of Patent: Apr. 23, 1985

[54] DEVICE AND PROCESS FOR MONITORING CAVITATION IN A POSITIVE DISPLACEMENT PUMP

[75] Inventor: Pierre C. Mouton, Grigny, France

[73] Assignee: Societe Nationale d'Etude de Constudies de Mateurs d'Aviation, France

[21] Appl. No.: 543,067

[22] Filed: Oct. 18, 1983

[30] Foreign Application Priority Data

Oct. 28, 1982 [FR] France ............... 82 18053

[51] Int. Cl.³ ............................................. F04B 21/00
[52] U.S. Cl. ...................... 417/63; 417/205; 417/251; 417/295
[58] Field of Search ............ 417/63, 85, 89, 251, 417/199 R, 199 A, 205, 206, 53, 295; 60/39.091; 415/13

[56] References Cited

U.S. PATENT DOCUMENTS

| | | | |
|---|---|---|---|
| 2,640,423 | 6/1953 | Boyer | 417/63 |
| 2,782,595 | 2/1957 | Pauly | 417/251 X |
| 3,942,724 | 3/1976 | Mocarski | |
| 3,963,378 | 6/1976 | McMillan | |
| 4,025,238 | 5/1977 | Masclet | 417/251 X |
| 4,311,436 | 1/1982 | Hendriks | 417/63 X |
| 4,404,812 | 9/1983 | Zinsmeyer | 417/13 X |

FOREIGN PATENT DOCUMENTS 1282772 1/1961 France.
2170637 9/1973 France.
2268956 11/1975 France.
2320435 3/1977 France.
2343138 9/1977 France.

OTHER PUBLICATIONS

G. D. Fatzer et al., "Control of Processes by Process Simulator Incorporating Radiotracers", IBM Technical Disclosure Bulletin, vol. 11, No. 9, Feb. 1969.

Pierre R. Bernard, "Science d'Aujourd'hui Technique de Demain", IEEE Spectrum, Sep. 1967, pp. 135 and 140.

*Primary Examiner*—Edward K. Look
*Attorney, Agent, or Firm*—Bacon & Thomas

[57] ABSTRACT

A device and method are disclosed for monitoring the cavitation parameters of a positive displacement fuel pump. A flow proportional to the flow of the pump is branched off a supply line to a cavitation venturi at a pressure lower than the supply pressure, while regulating the proportional flow and the venturi so that the latter attains its cavitation range prior to the cavitation of the positive displacement pump. In this range, the pressure at the inlet of the venturi is equal to the critical feeder pressure of the volumetric pump. The difference between the supply pressure of the positive displacement pump and the pressure of the inlet of the venturi is detected and a control signal generated to activate an alarm or increase the pressure of the supply fluid.

14 Claims, 1 Drawing Figure

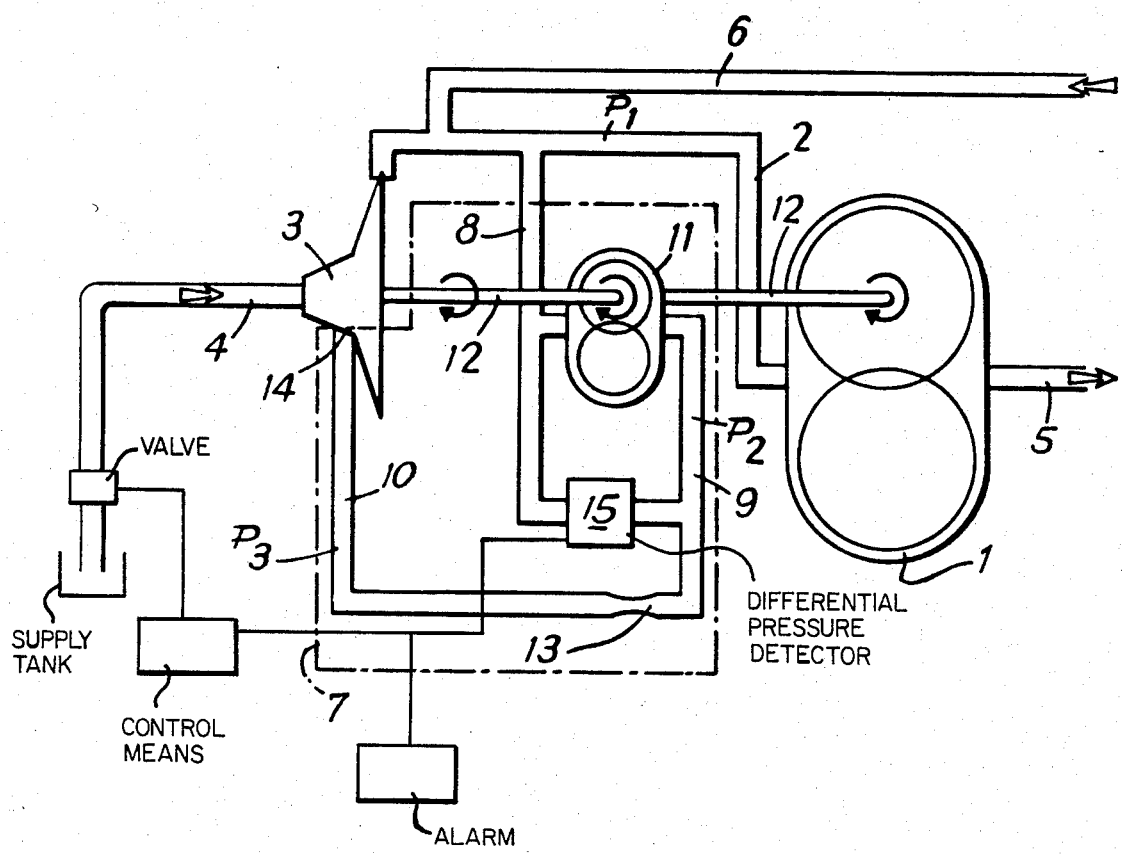

DEVICE AND PROCESS FOR MONITORING CAVITATION IN A POSITIVE DISPLACEMENT PUMP

FIELD OF THE INVENTION

The invention concerns a device and a process for detecting imminent cavitation of a positive displacement pump and generating a control signal to indicate or prevent such cavitation.

BRIEF DESCRIPTION OF THE PRIOR ART

Positive displacement pumps, especially aircraft fuel pumps, are sensitive to the phenomenon of cavitation which appears whenever the conditions of the fuel feed are insufficient to prevent the local or complete vaporization of the fuel in the intake zone of the pump.

Generally, there exists a critical feed pressure Pc necessary to prevent cavitation. This critical pressure Pc depends, on one hand, on factors essentially tied to the nature of the fuel at the temperature prevailing at the inlet of the pump, and on the other hand, on a factor which, for a pump of a given type, depends only on the feed rate. Known anticavitation devices are exemplified by French Pat. Nos. 2,268,956 and 2,343,138.

SUMMARY OF THE INVENTION

It is the object of the invention to provide a method and device for generating a signal that is representative of the deviation between the feed pressure of a rotating positive displacement pump and the critical values of the pressure which lead to cavitation.

The object is attained by means of a device which comprises a generator of a fluid flow proportional to the flow of the positive displacement pump, a branch line connecting the pressure supply line of the positive displacement pump to the generator inlet, and a branch line connecting the generator outlet to a cavitation venturi with a low pressure flow. The characteristics of the flow generator and of the venturi are predetermined as a function of the characteristics of the positive displacement pump so that cavitation will occur in the venturi prior to the cavitation of the positive displacement pump and that, at this mode of operation, the pressure at the inlet of the venturi will be equal to the citical feed pressure of the positive displacement pump. The apparatus further comprises means to detect the difference between the supply pressure of the positive displacement pump and the inlet pressure of the venturi.

It has been discovered according to the invention that in a circuit of the abovementioned type, it is possible to define the characteristics of the volumetric machine constituting the flow generator and of the venturi in a manner so as to obtain, upstream from the venturi, a pressure that is representative of the critical feed pressure.

According to the invention, the flow generator is a volumetric machine driven in a fashion that is proportional to the drive of the positive displacement pump. Also, the positive displacement pump is supplied by a feeder pump and the venturi discharges onto the outlet of the inductor of the feeder pump. In a further feature, the venturi has a throat with a variable cross section, which permits the regulation of the cavitation characteristics of the pump.

The invention further relates to a process for the detection of and protection against cavitation in a positive displacement pump, wherein a fluid flow having a pressure proportional to the feed pressure of the positive displacement pump is branched off said feed of said positive displacement pump into a cavitation venturi with a low pressure flow. The proportional flow and the venturi are controlled so that the venturi will experience cavitation prior to the cavitation of the positive displacement pump and that, when this occurs, the pressure at the inlet of the venturi will be equal to the critical feed pressure of the positive displacement pump. The process also includes detecting the difference between the feed pressure of the positive displacement pump and the inlet pressure of the venturi.

BRIEF DESCRIPTION OF THE DRAWING

The invention will become more apparent from the description hereinafter of a preferred embodiment of the invention, with reference to the single FIGURE attached hereto, which shows schematically a hydraulic assembly equipped with the device of the invention.

DETAILED DESCRIPTION OF THE PREFERRED EMBODIMENT

The positive displacement pump 1 to be monitored is supplied with fluid, such as fuel, through a feeder line 2 by a feeder pump 3, which itself is connected by the conduit 4 with a supply source (not shown). The pump 1 forces the fluid under high pressure into the delivery line 5, while a return flow is provided to the line 2 by the return conduit 6.

The device of the invention 7, the entirety of which is outline schematically by the dash-and-dot line, comprises a branch line, comprising conduits 8, 9, and 10, branched off the feeder line 2 of the positive displacement pump 1; a flow generator 11; a venturi 13; and a differential pressure detector 15. The flow generator 11 may take the form of a volumetric machine (such as a gear pump, a piston pump, vane pump, etc.), the flow rate of which is proportional to the flow of the positive displacement pump 1, indicated by a drive shaft 12 which is common to the feeder pump 3, the volumetric machine 11 and the pump 1. Quite obviously, different layouts are possible without exceeding the scope of the invention.

The volumetric machine 11 has linear (or tangential) velocities lower than those of the pump 1 to be monitored, so that it will operate outside its cavitation range when the critical feeder pressure is attained or is at the point of being attained in the pump to be monitored.

The volumetric machine 11 is supplied from feeder line 2 via conduit 8 at pressure $P_1$ and discharges into a cavitation venturi 13, via conduit 9 at pressure $P_2$. Cavitation venturi 13 discharges, at a pressure $P_3$ that is much lower than the pressure $P_1$ of the supply to the pump 1, into the outlet 14 of the inductor of the feeder pump 3 in conduit 10. Feeder pump 3 can be a pump of the type disclosed in U.S. Pat. Nos. 3,004,494 and 3,408,943.

A differential pressure detector 15 detects the difference between the feeder pressure $P_1$ of the pump 1 (via conduit 8) and the pressure $P_2$ (via conduit 9) which is less than the pressure $P_1$. Pressure $P_3$ is much lower than the pressure $P_1$. The volumetric machine 11 then operates as a motor.

When the vaporization of the fluid is attained at the throat of the venturi 13, the flow rate of the venturi becomes maximum and proportional to $[(P_2-Pv)/\rho]^{\frac{1}{2}}$ where Pv is the vapor pressure of the fluid and $\rho$ its specific gravity. Under these conditions the flow of the venturi is no longer able to pass the flow of the volumetric machine 11, and the pressure $P_2$ must therefore rise. This is the result of the fact that the volumetric machine 11 now operates as a pump.

By careful selection of design parameters (cylinder capacity of the volumetric machine and cross section of the venturi throat), it is possible to make $P_2$ equal to the critical feeder pressure (Pc) when the feeder threshold of the pump to be studied is attained.

In effect, considering that the flow transported by the volumetric machine 11 proportionally to the angular velocity N of the rotation of the positive displacement pump 1, must pass through the venturi in the cavitation range, the following is obtained:

$$K_1 N = K_2 [(P_2 - Pv)/\rho]^{\frac{1}{2}}$$

wherein $K_1$ is a proportionality factor depending on the characteristics of the volumetric machine 11 (its cylinder capacity) and $K_2$ a proportionality factor depending on the characteristics of the venturi 13 (its throat cross section).

The preceding equation leads to:

$$P_2 = Pv + K_3 \rho N^2$$

wherein $K_3 = (K_1/K_2)^2$.

It is further known that, to prevent cavitation in positive displacement pump 1, the critical feed pressure is of the form of:

$$Pc = Pv + K\rho N^2$$

wherein K is a coefficient of the technology of the positive displacement pump 1.

Consequently, by choosing the characteristics of the volumetric machine 11 and the venturi 13 so that $K_3 = K$, it is assured that if $P_2$ is less than $P_1$, $P_1$ is higher than the critical feed pressure (Pc) and the pump to be monitored operates outside the cavitation range. If, on the other hand, $P_2$ is higher than $P_1$, the pump operates in the cavitation range. Naturally, if cavitation is not attained at the throat of the venturi, the $P_2$ pressure is smaller than $P_1$ and cavitation in the pump to be monitored does not take place.

The cavication range detected may be made variable by using a venturi with a throat cross-section made variable by means of a needle valve or the like.

Thus, the surveillance of the difference in pressure $P_1 - P_2$ given by the signal from detector 15 gives the margin of safety for operating the pump 1 outside the cavitation range. This detection signal may be used as an alarm (making it possible for example on a supersonic aircraft to change the supply of fuel from a hot tank to a tank where the fuel is still relatively cold), or as a control signal to re-establish an adequate feeder pressure.

It appears clearly that one of the advantages of the invention is to provide an indication of the protection against cavitation, taking into consideration at every moment the actual characteristics of the fluid. Its application is particularly advantageous of fuel supply systems in, for example, aircraft turbine engines or turbojet engines, especially in view of the fact that they are supplied with fuel the nature of which may vary from one take-off airport to another and/or above all the fact that the temperature of the fuel may vary with the conditions of flight (especially time), particularly in supersonic aircraft.

The foregoing description is provided for illustrative purposes only and is not to be construed as in any way limiting the invention, the scope of which is defined by the appended claims.

I claim:

1. A device for monitoring cavitation parameters of a positive displacement pump in a fluid system comprising:
   (a) supply means to apply fluid to the positive displacement pump via a feeder line at a first pressure ($P_1$);
   (b) a venturi;
   (c) flow generating means for generating a flow of fluid proportional to the flow of the positive displacement pump, the flow generating means having an inlet connected to the feeder line and an outlet connected to the venturi inlet to supply fluid thereto at a second pressure ($P_2$), the capacity of the flow generating means the throat cross-section of the venturi being such that cavitation occurs in the venturi throat prior to cavitation occurring in the positive displacement pump; and,
   (d) detecting means to detect the difference between the first ($P_1$) and second ($P_2$) pressures and to generate a signal when the difference between $P_1$ and $P_2$ reaches or exceeds a predetermined limit.

2. The device of claim 1 further comprising alarm means connected with the detecting means such that the signal generated by the detecting means causes the alarm to be activated.

3. The device of claim 1 further comprising control means to control the supply of fluid to the positive displacement pump and means connecting the control means to the detecting means such that the signal generated by the detecting means causes the control means to supply fluid at an adequate pressure to prevent cavitation in the positive displacement pump.

4. The device of claim 1 wherein the flow generating means is a volumetric machine driven proportionally to the positive displacement pump.

5. The device of claim 4 wherein the supply means comprises a feeder pump having an inductor outlet and further comprising means to connect the outlet of the venturi to the inductor outlet.

6. The device of claim 5 wherein the venturi has a throat with a variable cross section.

7. The device of claim 4 wherein the venturi has a throat with a variable cross section.

8. The device of claim 1 wherein the venturi has a throat with a variable cross section.

9. The device of claim 1 wherein the supply means comprises a feeder pump having an inductor outlet and further comprising means to connect the outlet of the venturi to the inductor outlet.

10. The device of claim 9 wherein the venturi has a throat with a variable cross section.

11. A process for monitoring cavitation parameters of a positive displacement pump in a fluid system comprising the steps of:
   (a) supplying fluid to the positive displacement pump at a first pressure ($P_1$);
   (b) generating a secondary flow of fluid proportional to the flow of the positive displacement pump, the secondary flow being at a second pressure ($P_2$);
   (c) directing the secondary flow through a venturi having a throat cross-section such that cavitation occurs in the throat of the venturi prior to cavitation occurring in the positive displacement pump;
(d) detecting the difference between the first pressure ($P_1$) and the second pressure ($P_2$); and,
(e) generating a control signal when the difference between $P_1$ and $P_2$ reaches or exceeds a predetermined limit.

12. The device of claim 1 wherein the ratio of the capacity of the flow generating means ($K_1$) to the throat cross-section ($K_2$) of the venturi is defined by:

$$\left(\frac{K_1}{K_2}\right)^2 = \frac{P_c - P_v}{\rho N^2}$$

where:
$P_c$ = Critical feed pressure necessary to prevent cavitation
$P_v$ = Vapor pressure of fluid
$\rho$ = Specific gravity of fluid
$N$ = Angular velocity of the positive displacement pump.

13. The process of claim 11 wherein the secondary flow is generated by driving a flow generating means from the positive displacement pump.

14. The process of claim 13 wherein the ratio of the capacity of the flow generating means ($K_1$) to the throat cross-section ($K_2$) is selected to be:

$$\left(\frac{K_1}{K_2}\right)^2 = \frac{P_c - P_v}{\rho N^2}$$

where:
$P_c$ = Critical feed pressure necessary to prevent cavitation
$P_v$ = Vapor pressure of fluid
$\rho$ = Specific gravity of fluid
$N$ = Angular velocity of the positive displacement pump.

* * * * *

UNITED STATES PATENT AND TRADEMARK OFFICE
CERTIFICATE OF CORRECTION

PATENT NO.  : 4,512,722
DATED       : April 23, 1985
INVENTOR(S) : MOUTON

It is certified that error appears in the above-identified patent and that said Letters Patent is hereby corrected as shown below:

Col. 1, line 46:   "citical" should read -- critical --;
Col. 2, line 32:   "outline" should read -- outlined --;
Col. 3, line 47:   "cavication" should read -- cavitation --;

IN THE CLAIMS:

Col. 4, line 11:        "apply" should read -- supply --;
Col. 4, line 21:   after "means", insert -- and --.

Signed and Sealed this

Twenty-seventh Day of August 1985

[SEAL]

Attest:

DONALD J. QUIGG

Attesting Officer    Acting Commissioner of Patents and Trademarks